M. M. HUGHES.
MEANS FOR PRODUCING A CORRECT WRITING HABIT.
APPLICATION FILED OCT. 17, 1912.

1,061,913.   Patented May 13, 1913.

WITNESSES

INVENTOR
Margaret M. Hughes,
BY
ATTORNEYS

UNITED STATES PATENT OFFICE.

MARGARET M. HUGHES, OF NEW YORK, N. Y.

MEANS FOR PRODUCING A CORRECT WRITING HABIT.

1,061,913.  Specification of Letters Patent.   Patented May 13, 1913.

Application filed October 17, 1912. Serial No. 726,274.

*To all whom it may concern:*

Be it known that I, MARGARET M. HUGHES, a citizen of the United States, and a resident of the city of New York, borough of the Bronx, in the county and State of New York, have invented a new and Improved Means for Producing a Correct Writing Habit, of which the following is a full, clear, and exact description.
The invention relates to educational appliances, and its object is to provide a new and improved means for producing a correct writing habit in a comparatively short time and to teach a pupil the correct formation of the written letters of the alphabet, numerals, signs and other indicating characters pertaining to penmanship.

In order to accomplish the desired result, use is made of a plate or a tablet provided on its face with a practice guideway, preferably in the form of an endless groove, and a second guideway representing an indicating character and having its initial stroke leading out of the said practice groove so that the pupil in moving the point of a pencil, stylus or other tool along the practice groove acquires the proper hand movement for correct writing, and on finally switching off into the second guideway and following the same the pupil acquires the correct formation of the indicating character represented by the second guideway.

A practical embodiment of the invention is represented in the accompanying drawings forming a part of this specification, in which similar characters of reference indicate corresponding parts in all the views.

Figure 1:
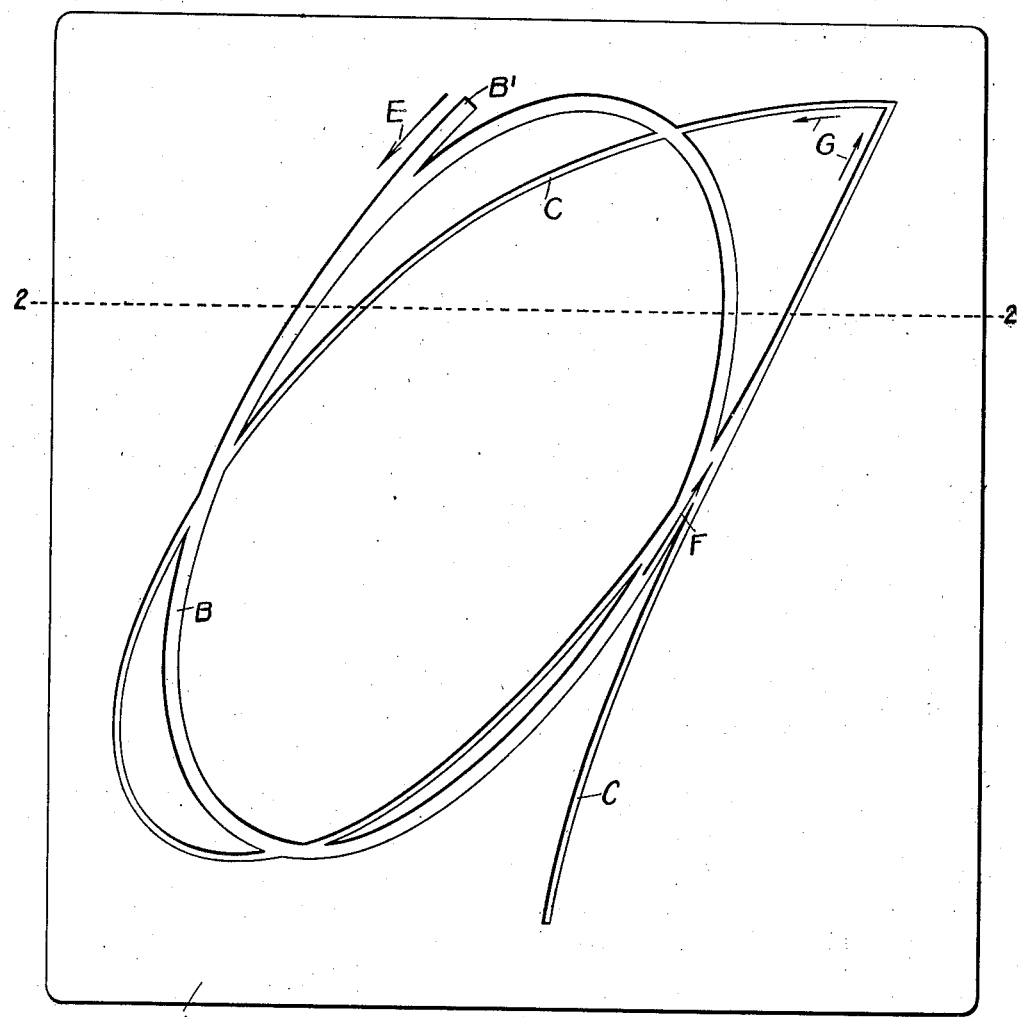
Figure 2:
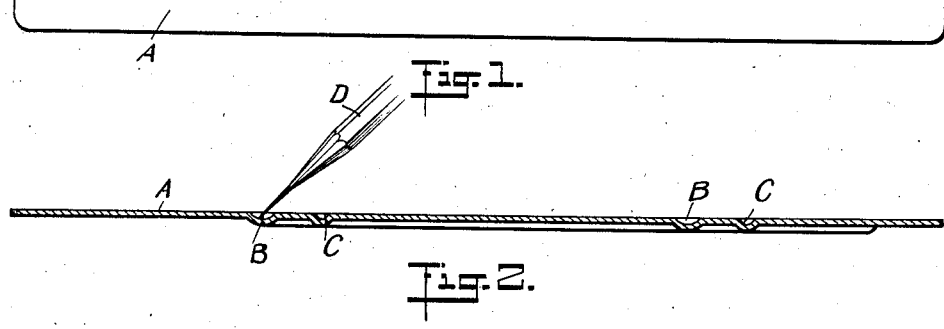

Figure 1 is a plan view of one of the plates or tablets having an oval practice groove for producing correct writing habit and having a second groove for the formation of the capital letter A; Fig. 2 is a side elevation of the same on the line 2—2 of Fig. 1.

A plate or tablet A of stiff paper, cardboard, metal or other suitable material, is provided on its face with a practice guideway B, preferably in the form of a groove, and a second guideway C likewise in the form of a groove is formed in the face of the plate A. The guideway B is endless and preferably in the form of an oval, the major axis of which is inclined as indicated in the drawings, and the guideway B is provided with an inlet B' leading tangentially into the guideway B, as plainly indicated in the drawings. The guideway C represents in outline an indicating character, such as a letter of the alphabet, numeral, sign, symbol or a like character pertaining to penmanship, and the initial stroke of this guideway leads from the guideway B at one point thereof according to the formation of the character represented by the guideway C, as will be readily understood by reference to the drawings. The guideway C is in contrast to the guideway B, preferably by making it narrower than the guideway B or by coloring it so that the said guideways are differentiated to ocularly distinguish one from the other.

The point of a pen, pencil, stylus or a similar tool D held in the hand of a pupil is first moved around the guideway B starting at the inlet B', and then after a number of turns the point is switched into the other guideway C and followed until the end thereof is reached. The pupil repeats this operation so that in following the guideway B with the point of the pencil D a correct writing habit is produced, and in following the guideway C correct formation of the corresponding indicating character is obtained.

An arrow E is preferably placed adjacent the inlet B so as to indicate to the pupil in which direction to start in the guideway B, and an arrow F is preferably placed at the initial stroke of the guideway C, that is, at the point where the letter leads out of the guideway B. Other arrows G may also be used along the guideway C to indicate to the pupil in which direction to move the point of the tool D.

In using the device in schoolrooms, for instance, plates or tablets having the same letter or other indicating character are distributed to the scholars, and at the command of the teacher the pupils start simultaneously with their pencils or similar tools and move the points thereof around and around in the oval of practice grooves until the teacher next commands them to leave the practice grooves and to pass the point of the tool into the second groove to the end thereof. It will be noticed that by this procedure each pupil acquires first the proper swing of the pencil on following the practice groove, to finally wind up with the swing or movement for the correct formation of the particular letter of the alphabet or other indicating character represented by the groove associated with the practice groove and forming practically an extension thereof.

From the foregoing it will be seen that the school class work in penmanship is greatly facilitated, and the plates or tablets may be used by individuals for self-instruction in penmanship.

Although but one example of a capital letter of the alphabet has been illustrated and described it is evident that I do not limit myself to this example as sets of plates or tablets may be used that contain all the capital and small letters of the alphabet as well as numerals, and combinations of different letters, signs, and other indicating characters pertaining to penmanship.

It is understood that the oval practice guideway is inclined as shown to enable the user to acquire the proper curved stroke so essential in the formation of most of the letters of the alphabet or other indicating characters.

Having thus described my invention, I claim as new and desire to secure by Letters Patent:

1. Means for producing a correct writing habit and for teaching the formation of indicating characters, comprising a practice guideway for guiding a tool in the hands of a pupil, and a guideway representing an indicating character and connected with the said practice guideway to allow the tool to pass from one to the other without interruption of the movement of the pencil.

2. Means for producing a correct writing habit, and for teaching the formation of indicating characters, comprising an endless practice guideway for guiding the point of a tool in the hand of a pupil, and an indicating character guideway representing in outline an indicating character and connected with and starting from the said endless guideway.

3. Means for producing a correct writing habit and for teaching the formation of the letters of the alphabet, comprising a plate having in its face an oval practice guideway in the form of a groove, and a second guideway in the form of a groove and representing in outline a letter of the alphabet, the said second guideway having its beginning end at a point in the said practice groove.

4. Means for producing a correct writing habit and for teaching the formation of the letters of the alphabet, comprising a plate having in its face an oval practice guideway in the form of a groove, and a second guideway in the form of a groove and representing in outline a letter of the alphabet, the said second guideway having its beginning end at a point in the said practice groove, the said practice guideway and the said second guideway being differentiated to ocularly distinguish one from the other.

5. Means for producing a correct writing habit and for teaching the formation of the letters of the alphabet, comprising a plate having in its face an oval practice guideway in the form of a groove, a second guideway in the form of a groove and representing in outline a letter of the alphabet, the said second guideway having its beginning end at a point in the said practice groove, the said practice guideway being wider than the said second guideway.

6. Means for producing a correct writing habit and for teaching the formation of indicating characters, comprising a plate having in its face an oval practice groove provided with an inlet, the said plate having in its face a second groove representing a letter of the alphabet and having its beginning end leading from the said practice groove.

7. Means for producing a correct writing habit and for teaching the formation of indicating characters, comprising a plate having in its face an oval practice groove provided with an inlet, the said plate having in its face a second groove representing a letter of the alphabet and having its beginning end leading from the said practice groove, an arrow arranged on the face of the plate at the said inlet to the oval practice groove, and an arrow arranged on the face of the plate at the initial stroke of the second groove.

In testimony whereof I have signed my name to this specification in the presence of two subscribing witnesses.

MARGARET M. HUGHES.

Witnesses:
 THEO. G. HOSTER,
 PHILIP D. ROLLHAUS.